United States Statutory Invention Registration [19]

[11] Reg. Number: H507

Portnoy et al. [43] Published: Aug. 2, 1988

[54] DERIVATIZED STARCH PRODUCTS AS PROTECTIVE COLLOIDS IN EMULSION POLYMERIZATION PROCESSES

[75] Inventors: Norman A. Portnoy, Decatur, Ill.; Frank T. Orthoefer, Lafayette, La.

[73] Assignee: A. E. Staley Manufacturing, division of Staley Continental, Inc., Decatur, Ill.

[21] Appl. No.: 42,614

[22] Filed: Apr. 20, 1987

Related U.S. Application Data

[63] Continuation-in-part of Ser. No. 850,792, Apr. 11, 1986, abandoned.

[51] Int. Cl.[4] ..... C08F 2/26; C08L 3/00
[52] U.S. Cl. ..... 526/200; 524/734
[58] Field of Search ..... 524/734; 526/200

[56] References Cited

U.S. PATENT DOCUMENTS

| | | | |
|---|---|---|---|
| 1,444,257 | 2/1923 | Lilienfeld | 536/85 |
| 2,163,305 | 6/1939 | Dittmar | 526/200 |
| 2,401,445 | 6/1946 | White | 526/200 |
| 3,534,010 | 10/1970 | Cornell | 526/200 |
| 3,548,035 | 12/1970 | Ohe et al. | 526/200 |
| 3,769,248 | 10/1973 | Kovats | 260/17.4 |
| 4,322,322 | 3/1982 | Lambrechts et al. | 526/200 |

OTHER PUBLICATIONS

Starch, Chem. and Technology, II, Ind. Aspects, Whistler and Paschall (1967), pp. 314 and 319.
Radley, Starch Prod. Tech., Applied Sci., Publ., Ltd. (1976), pp. 506, 507.

*Primary Examiner*—John F. Terapane
*Assistant Examiner*—J. E. Thomas

[57] ABSTRACT

Methylated, ethylated or carboxymethylated starch products which have, per anhydroglucose unit within the starch molecule, an average of from about 0.03 to about 1.0 methyl, ethyl or carboxymethyl substituents covalently bonded thereto and which contain a combined total of less than 1 weight percent, on a dry starch solids weight basis, of polyvalent inorganic anions, monovalent inorganic anions and methylsulfate and ethylsulfate anions are particularly well suited for use as protective colloids in emulsion polymerization or copolymerization processes.

10 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

DERIVATIZED STARCH PRODUCTS AS PROTECTIVE COLLOIDS IN EMULSION POLYMERIZATION PROCESSES

This application is a continuation-in-part of application Ser. No. 850,792, filed Apr. 11, 1986, now abandoned.

BACKGROUND OF THE INVENTION

The present invention pertains to certain methylated, ethylated or carboxymethylated starch compositions and to the use of same as protective colloids in emulsion polymerization processes.

Methylated, ethylated and carboxymethylated starch materials are generally known types of starch derivatives which are typically prepared, respectively, by reacting starch with a methylating agent such as dimethyl sulfate or a methyl halide, an ethylating agent such as diethyl sulfate or an ethyl halide or a carboxymethylating agent such as a haloacetic acid or a salt thereof under aqueous alkaline conditions.

U.S. Pat. No. 1,444,257 to Lilienfeld (issued Feb. 6, 1923) discussed the usefulness of ethylated starch and methylated starch as protective colloids and, according to the book entitled "*Starch: Chemistry and Technology, Volume II, Industrial Aspects*" by Whistler and Paschall (1967) at page 314, such starch derivatives have also been suggested as being useful as soil suspending agents in detergents, as flocculants for pigments, thickeners in paper screening and as a component of photographic transfer layers.

A book entitled *Starch Production Technology* by J. R. Radley, Applied Science Publishers, Ltd. (1976) indicates, at page 506, that carboxymethyl starch derivatives are much used in the textile industry. Such book also reports that conducting the reaction to prepare such derivatives in a water-miscible solvent (preferably isopropanol) containing minor amounts of water improves the reaction efficiency.

U.S. Pat. No. 3,769,248 to Kovats (issued Oct. 30, 1973) mentions carboxymethyl starch as being suitable for use as a protective colloid in vinyl acetate emulsion polymerization and copolymerization processes.

At page 319 of the aforementioned book by Whistler and Paschall, it is noted that miscellaneous uses of carboxymethyl starch include use as an indicator in iodometric titrations, use as a soil conditioner, use as a component in latex paint, use as a paint remover component, use as a binder for kaolin castings as well as usage in lithography applications, photographic film emulsions and granular explosive compositions.

In the manufacture of methylated, ethylated and carboxymethylated starch derivatives via the reaction, respectively, of starch with methyl halides, dimethyl sulfate, diethyl sulfate, ethyl halides, haloacetic acids (or salts thereof), etc. under aqueous alkaline conditions, inorganic salts such as alkali metal (e.g., sodium or potassium) halides or alkali metal methylsulfates or ethylsulfates are generated as reaction byproducts. On page 507 of the aforementioned book by J. A. Radley, it is stated that attempts to remove such inorganic salts from carboxymethyl starch products have included (a) precipitation and washing with alcohol; (b) salting out with sodium sulfate and screening off the salts after grinding; and (c) precipitation with alum and resolubilizing with alkali. This reference goes on to note, however, that for the majority of commercial applications, the salts are left in since their technical effect is one of dilution only.

SUMMARY OF THE INVENTION

In accordance with the present invention, it has been discovered that certain methylated, ethylated and carboxymethylated starch derivatives having reduced levels of the aforementioned reaction byproducts contained therein are particularly well suited for use as protective colloids in processes for the emulsion polymerization of addition polymerizable ethylenically unsaturated monomer materials. More specifically, it has been found that the suitability of such derivatives for such purpose is notably enhanced when said derivatives have an average degree of methyl, ethyl or carboxymethyl substitution of from about 0.03 to about 1.0 of such substituents per anhydroglucose unit in the starch molecule and contain a combined total of less than 1 weight percent, on a starch material dry weight basis, of anions selected from the group consisting of polyvalent inorganic anions, monovalent inorganic anions and methylsulfate and ethylsulfate anions.

Particularly preferred starch derivatives for use in accordance with the present invention have total inorgnic anion contents of less than about 0.8 weight percent on a starch material dry weight basis and it is also generally preferred that said derivatives have polyvalent inorganic anion contents of less than 0.5 (more preferably less than 0.25 and most preferably less than 0.1) weight percent on a starch material dry weight basis.

In accordance with the foregoing, the present invention is a method for emulsion polymerizing one or more addition polymerizable monomer materials, said method being characterized by the use as a protective colloid in said emulsion polymerization of from about 0.05 to about 2 (preferably from about 0.1 to about 1 and more preferably from about 0.1 to about 0.6) weight percent on a total batch weight basis of the aforementioned methylated, ethylated or carboxymethylated starch material. Especially preferred starch derivatives for such usage are those which have an average degree of methyl, ethyl or carboxymethyl substitution in the range of from about 0.05 to about 0.6 (more preferably from about 0.05 to about 0.4 and most preferably from about 0.05 to about 0.3) of such substituents per anhydroglucose unit in the starch molecule; which contain on a starch material dry solids weight basis, a combined total of less than about 0.8 weight percent of anions selected from the group consisting of polyvalent inorganic anions, monovalent inorganic anions and methylsulfate and ethylsulfate anions; and which have, on the same starch material dry solids weight basis, a polyvalent inorganic anion content of less than 0.1 weight percent.

As used herein, the term "inorganic anion" is not intended to encompass or include hydroxyl anions (i.e., $OH^-$). Further, the term "inorganic anion" as used herein shall be deemed not to be inclusive of methylsulfate and ethysulfate anions and these latter two monovalent anions (i.e., methylsulfate and ethylsulfate) will, where appropriate, be recited and treated separately from "monovalent inorganic anions".

DETAILED DESCRIPTION OF THE INVENTION

Starch derivatives suitable for use in the present invention (preferably in ungelatinized granular derivatized form) can suitably be derived from starches obtained from a wide variety of plant sources such as, for example, corn, potato, wheat, rice, waxy maize, tapioca, etc. Such starches can be unmodified or can be chemically modified such as, for example, by known multifunctional starch crosslinking agents.

Preferred starch derivatives for use herein are derived from unmodified, ungelatinized granular starches obtained from corn, potato, tapioca and waxy maize. The term "ungelatinized" as used herein connotes starch which has not been subjected to granule fragmenting process conditions and which therefore consists essentially of whole unfragmented granules.

Generally speaking, the indicated starch derivatives are typically prepared by the reaction, respectively, of a starch starting material with a methylating, ethylating or carboxymethylating agent under aqueous alkaline conditions and the particular method chosen for doing so is not particularly critical so long as the resulting starch derivative has a methyl, ethyl or carboxymethyl degree of substitution of from about 0.03 to about 1 and contains a combined total of less than 1 weight percent of the above-described monovalent and polyvalent anions. Preferably said reaction is conducted in a water-miscible organic solvent (preferably a lower, e.g., $C_1$–$C_4$, alkanol such as methanol, ethanol or isopropanol) containing a relatively small amount of water (e.g., from about 1 to about 20, preferably from about 5 to about 15, weight percent water on a solvent plus water weight basis) and the resulting methylated, ethylated, or carboxymethylated starch product (which remains in substantially non-gelatinized granular form) is separated from the liquid reaction medium by a suitably convenient means such as by centrifugation, filtration, etc. Such aqueous water-miscible organic solvent processed non-gelatinized granular starch derivatives typically have a fat content, after processing, of less than 0.25 (preferably less than 0.15) weight percent on a starch derivative dry solids weight basis.

The reaction between the methylating, ethylating or carboxymethylating agent and the starch starting material is typically conducted at a dry starch solids content within the reaction mixture of from about 8 to about 25 (preferably from about 10 to about 18) weight percent (total weight basis); at a temperature of from about 60° to about 130° C. (preferably from about 80° to about 110° C.); at an alkali metal oxide or hydroxide level of from about 0.2 to about 12 (preferably from about 0.5 to about 5) weight percent on a total reaction mixture weight basis; and for a reaction period of from about 20 minutes to about 2½ hours (preferably from about ½ to about 1 hour). Typically, such reaction is conducted in a glass (or glass-lined) vessel or, at higher temperatures, in a closed stainless steel reaction vessel capable of withstanding the pressure attendant to the reaction conditions.

The amount of methylating, ethylating or carboxymethylating agent (preferably methyl chloride, ethyl chloride or chloroacetic acid or salt thereof) employed in the foregoing reaction will generally depend upon the degree of methyl, ethyl or carboxymethyl substitution desired within the final starch derivative. Since the average degree of substitution (D.S.) typically desired for products of interest herein is from about 0.03 to about 1.0 (preferably from about 0.05 to about 0.6) of the desired methyl, ethyl or carboxymethyl substituent per anhydroglucose unit within the starch molecule, the amount of methyl halide, ethyl halide, or haloacetic acid (or salt) reactant employed will generally range from about 0.03 to about 1.5 (preferably from about 0.05 to about 0.9) moles of said reactant per equivalent weight of anhydroglucose units within the starch staring material.

Following the initial preparation of the subject methylated, ethylated, or carboxymethylated starch products in the fashion indicated above, such products are advantageously treated with an acidic material to neutralize any residual alkali metal oxide or hydroxide remaining therein. Preferably, an organic carboxylic acid material such as acetic acid, citric acid, formic acid, oxalic acid, etc. (most preferably acetic acid) is employed for such purpose in order to avoid introducing additional levels of inorganic anions into the starch derivatives of interest.

As has been noted above, a key feature or characteristic of the methylated, ethylated or carboxymethylated starch derivatives to be employed herein is that they contain a combined total of less than 1 weight percent, on a starch material dry solids weight basis of polyvalent inorganic anions (e.g., sulfate anions, phosphate anions, etc.) monovalent inorganic anions, (e.g., halide anions such as chloride, bromide, iodide, etc.) and methylsulfate and ethylsulfate anions. Thus, for example, since at a methyl, ethyl or carboxymethyl D.S. of 0.05 or more the starch derivative obtained by reacting starch with ethyl chloride, methyl chloride or chloromethyl acetic acid would generally have a chloride content in excess of 1 weight percent on a starch material dry solids weight basis, it is generally necessary to thoroughly wash such derivative (preferably with an aqueus lower alkanol solution containing, for example from about 1 to about 30, preferably from about 5 to about 20, weight percent water) to reduce the chloride (and/or other inorganic anion) content thereof to a level of less than 1 weight percent on a starch product dry solids weight basis. Preferably, such derivatives are washed sufficiently to reduce the level of the indicated undesired anions to less than 0.8 (more preferably less than 0.5) weight percent on a starch material dry weight basis.

Preferred methylated, ethylated or carboxymethylated starch derivatives for use in the present invention are in non-gelatinized granular form. Preferably, such starch derivatives also have a total ash content of less than 10 weight perent and an alkali metal cation content of less than 5 weight percent (both being stated on a starch material dry solids weight basis). Such preferred ash and alkali metal content criterion are conveniently obtained by conducting the derivatization reaction in an aqueous water-miscible organic solvent medium as described earlier herein and by thoroughly washing the resulting derivatized product, after its preparation, with an aqueous water-miscible solvent mixture, preferably the aforementioned aqueous lower (e.g., $C_1$–$C_4$) alkanol solution.

It is also generally preferred that the indicated starch derivatives contain less than 0.5 (more preferably less than 0.25 and most preferably less than 0.1) weight percent of polyvalent inorganic anions (such as, for example, sulfate anions, phosphate anions, etc.) on a starch material dry solids weight basis. Such relatively low levels of polyvalent inorganic anions can generally be achieved by ensuring that any residual alkali neutralization is conducted using an organic carboxylic acid such as, for example, a lower alkanoic acid (i.e., as opposed to inorganic acids such as sulfuric, nitric, phosphoric, etc.) and/or by thoroughly washing the derivatized product following its preparation and neutralization with an aqueous (e.g., having a water content of from about 1 to about 30, preferably from about 5 to about 20, weight percent) water miscible solvent (preferably a $C_1$–$C_4$ alkanol) solution.

As a word of caution, however, it has been found, with respect to very low polyvalent inorganic anion levels (e.g., of 0.04 weight percent or less), that polyvalent inorganic anionic content in excess of such low levels can be imparted to the starch derivative products of interest by virtue of polyvalent inorganic anion levels contained in ordinary tap water used in the liquid reaction medium and/or in subsequent washing operations. As such, it may at times (i.e., depending upon the inorganic polyvalent anion content of the tap water or process water available for use in a given instance) be necessary either to employ deionized water or to take steps to reduce the polyvalent inorganic anion content of the water to be employed in order to achieve the above-indicated (and most preferred) very low polyvalent inorganic anion contents within the starch derivative products of interest herein.

In connection with the use of the indicated starch derivatives as protective colloids in emulsion processes, such starch derivatives are generally employed in an amount ranging from about 0.05 to about 2 (preferably from about 0.1 to about 1) weight percent on a total reaction mixture weight basis and are employed in a fashion which is otherwise (i.e., apart from the fact of utilizing the indicated starch derivatives hereof) in accordance with conventional protective colloid usage in said polymerization processes. Thus, for example, the emulsion polymerization or copolymerization process of interest is generally conducted by preheating a relatively dilute initial aqueous surfactant solution containing from about 3 to about 8 weight percent of a suitable surfactant system and the desired amount of the aforementioned starch derivative to a temperature of from about 60° about 85° C. in a stirred reaction vessel; adding a suitable polymerization initiator such as, for example, sodium persulfate to said aqueous solution; gradually adding the selected monomer ingredient(s) to be polymerized over a time period of from about 3 to about 6 hours along with a gradual feed stream of a relatively concentrated aqueous surfactant solution containing from about 15 to about 20 weight percent of a suitable surfactant therein (said monomer ingredient typically constituting approximately 120 to 140 weight percent of the initial aqueous solution and said relatively concentrated aqueous surfactant solution constituting approximately 10 to 15 weight percent relative to the weight of said initial solution); cooling the resulting polymerized product to about 25° to 35° C. and adding a relatively small amount (e.g., from about 1 to 5 percent on a total weight basis) of a relatively concentrated aqueous surfactant solution to further stabilize the resulting polymer emulsion.

Addition polymerizable ethylenically unsaturated monomer materials which may be suitably emulsion polymerized or copolymerized in accordance with the present invention include acrylate monomers such as methyl methacrylate, ethyl acrylate, butyl acrylate, 2-ethylhexyl acrylate, etc; vinyl aromatic monomers such as styrene, vinyl toluene, etc; vinyl esters of lower carboxylic acids such as vinyl acetate, vinyl propionate, vinyl butyrate, etc.; vinyl and viylidene halide monomers such as vinyl chloride, vinylidene chloride, etc.; and the like.

The present invention is further understood and illustrated by reference to the following examples thereof in which, unless otherwise indicated, all parts and percentages are on a weight basis and all temperatures are in degrees Celcius.

EXAMPLES 1–4

A series of carboxymethylated starches are prepared by slurrying 540 parts dry solids basis granular starch in an aqueous ethanol solution containing 3340 parts of ethanol and a total of 470 parts water; adding to said slurry 45–165 parts NaOH dissolved in 200 parts water; adding 53–195 parts chloroacetic acid dissolved in 400 parts ethanol and 50 parts water; and maintaining said reaction mixture in a closed stainless steel reaction vessel for a reaction period of 0.75 hours at 101° C. Following said reaction, the resultant reaction products are cooled to a temperature of about 82° C. and are treated with 6–15 parts glacial acetic acid dissolved in 18 parts ethanol; maintained at 82° C. for 0.33 hours and are further cooled to ambient temperature. Thereafter, the resulting carboxymethylated starch product is separated from the liquid medium by centrifugation and is washed with two 1660 part portions of a solution containing 1360 parts of ethanol and 300 parts of water.

The degree of carboxymethyl substitution (D.S.), sodium ion content, chloride ion content, sulfate ion content and ash content values for the various carboxymethylated starches prepared in the foregoing fashion is summarized in Table A below.

For comparative purposes, the corresponding data for carboxymethylated starches (i.e., Controls 1–3) prepared in the same fashion but not washed sufficiently to reduce the total inorganic anion (i.e., chloride ion and sulfate ion) content to less than 1 weight percent are also presented in Table A below.

For additional comparative purposes, the corresponding values are also presented in Table A for a carboxymethylated starch (i.e. Control 4) which is prepared by reacting 200 parts of chloroacetic acid with 600 parts dry solids basis starch under the conditions outlined above, except that the reaction temperature is 108° C. and the reaction is carried out for 30 minutes; neutralization is carried out with 18 parts of 60 Be′ sulfuric acid (80 wt. % $H_2SO$). The carboxymethylated starch is then separated by vacuum filtration and washed once with 2000 parts of a solution containing 150 parts water and 1850 parts of ethyl alcohol.

Each of the indicated carboxymethylated starches are evaluated as to their protective colloid effectiveness in a vinyl acetate-butyl acrylate emulsion copolymerization process corresponding to the recipe and process instructions summarized in Table B below. Grit level within the resulting latex product provides a convenient measure of protective colloid effectiveness, with grit levels below 200 parts per million (ppm) being indicative of accepatable protective colloid performance for the purposes of the present invention. Grit level is determined by passing the resulting latex through a 150–200 mesh polypropylene screen and measuring the residue retained on the screen to determine grit level in parts per million (ppm) based upon total latex weight. The grit levels obtained when each of the starch derivatives from Examples 1–4 and Controls 1–4 are evaluated for protective colloid effectiveness in the indicated vinyl acetate-butyl acrylate emulsion copolymerization process are presented in Table A below.

TABLE A

| EXAMPLE NUMBER | D.S. | % $Na^+$ | % $Cl^-$ | % $SO_4^=$ | % ASH | LATEX GRIT LEVEL (PPM) |
|---|---|---|---|---|---|---|
| 1 | 0.14 | 2.8 | 0.60 | 0.02 | 7.02 | 135 |
| 2 | 0.14 | 2.8 | 0.33 | 0.04 | 6.68 | 116 |
| 3 | 0.06 | 2.0 | 0.70 | 0.05 | 5.46 | 112 |
| 4 | 0.30 | 3.9 | 0.45 | 0.04 | 9.68 | 178 |
| Control #1 | 0.37 | 5.1 | 1.0 | 0.07 | 11.0 | 284 |
| Control #2 | 0.37 | 5.3 | 1.7 | 0.03 | 13.0 | 366 |
| Control #3 | 0.43 | 6.1 | 2.0 | 0.04 | 15.8 | 432 |
| Control #4 | 0.36 | 7.7 | 4.7 | 0.78 | 18.6 | 1076 |

TABLE B

VINYL ACETATE-BUTYL ACRYLATE EMULSION POLYMERIZATION PROCESS

| RECIPE INGREDIENTS (Parts by weight) | PREMIX A | PREMIX B | PREMIX C | PREMIX D |
|---|---|---|---|---|
| Water | 12,600 | | 1561 | 693 |
| Surfactant A (Igepal TM CO-977) | 700 | | | 175 |
| Surfactant B (Igepal TM CO-430) | 175 | | | |
| Surfactant C (Aerosol TM A-102) | | | 332.5 | |
| Carboxymethyl Starch | 140 | | | |
| Sodium Bicarbonate | 35 | | | |
| Dipropylene Glycol | 332.5 | | | |
| Sodium Persulfate | (17.5) | | 28.7 | |
| Vinyl Acetate | | 15,540 | | |
| Butyl Acrylate | | 2,765 | | |

PROCEDURE
(1) Charge Premix A without persulfate and heat to 75° C.
(2) Add persulfate from Premix A and wait 15 minutes at 75° C.
(3) Begin addition of monomer mix (Premix B) and Premix C at a rate to add it all in about 4½ to 5 hours. Temperature may need to be reduced to 70° C. temporarily to reduce reflux until reaction commences.
(4) Hold at 75° C. until all of Premix B and Premix C have been added. Then hold an additional one hour.
(5) Begin cooling to 60° C. at which point add post-stabilizer (Premix D).
(6) Continue cooling to 30° C. and discharge.

As can be seen from the results in Table A, the carboxymethyl starches having an inorganic anion (i.e., chloride and sulfate ion) content of less than 1 weight percent provide latex grit levels of less than 200 ppm and those having a total chloride plus sulfate anion content of 1 weight percent or more provide grit levels of greater than 200 ppm.

While the present invention has been described and illustrated herein by reference to specific embodiments and examples thereof, such is not to be interpreted as in any way limiting the scope of the instantly claimed invention.

What is claimed is:

1. A method for emulsion polymerizing one or more addition polymerizable monomer materials, said method being characterized by the use as a protective colloid in said emulsion polymerization of from about 0.05 to about 2 weight percent on a total batch weight basis of a methylated, ethylated or carboxymethylated starch material which has an average degree of methyl, ethyl or carboxymethyl substitution in the range of from about 0.03 to about 1.0 of such substituents per anhydroglucose unit in the starch molecule and which contains, on a starch material dry solids weight basis, a combined total of less than 0.8 weight percent of anions selected from the group consisting of polyvalent inorganic anions, monovalent inorganic anions and methylsulfate and ethylsulfate anions.

2. The method of claim 1 wherein the methylated, ethylated or carboxymethylated starch material contains an average of from about 0.05 to about 0.6 methyl, ethyl or carboxymethyl substituents per anhydroglucose unit in the starch molecule.

3. The method of claim 1 wherein the methylated, ethylated or carboxymethylated starch material contains an average of from about 0.05 to about 0.4 methyl, ethyl or carboxymethyl substituents per anhydroglucose unit in the starch molecule.

4. The method of claim 1 wherein the methylated, ethylated or carboxymethylated starch material has, on a starch material dry solids weight basis, a polyvalent inorganic anion content of less than about 0.1 weight percent.

5. The method of claim 4 wherein the methylated, ethylated or carboxymethylated starch material contains less than 5 weight percent of alkali metal cations on a starch material dry solids weight basis.

6. The method of claim 5 wherein the methylated ethylated or carboxymethylated starch material has a total ash content of less than 10 weight percent on a starch material dry solids weight basis.

7. The method of claim 1 wherein the methylated, ethylated or carboxymethylated starch material is in non-gelatinized, granular form.

8. The method of claim 7 wherein the methylated, ethylated or carboxymethylated starch material has an average degree of methyl, ethyl or carboxymethyl substitution in the range of from about 0.05 to about 0.3.

9. The method of claim 8 wherein the methylated, ethylated or carboxymethylated starch material has, on a starch material dry solids weight basis, a polyvalent inorganic anion content of less than about 0.1 weight percent.

10. The method of claim 9 wherein the methylated, ethylated or carboxymethylated starch material has a fat content of less than 0.25 weight percent on a starch material dry solids weight basis.

* * * * *